United States Patent

[11] 3,619,622

| [72] | Inventors | Harry O. Pfeiffer<br>North Canton;<br>Richard H. Wills, Tallmadge, both of Ohio |
|---|---|---|
| [21] | Appl. No. | 883,707 |
| [22] | Filed | Dec. 10, 1969 |
| [45] | Patented | Nov. 9, 1971 |
| [73] | Assignee | Goodyear Aerospace Corporation<br>Akron, Ohio |

[54] BRIGHTNESS DISTRIBUTION ELECTRON STORAGE TUBE
5 Claims, 3 Drawing Figs.

[52] U.S. Cl. ................................................. 250/213 VT,
  315/10, 340/173 CR
[51] Int. Cl. ................................................. H01j 39/12
[50] Field of Search ......................................... 340/173
  CR; 250/213 VT, 214; 313/94, 102; 315/10, 11

[56] References Cited
UNITED STATES PATENTS
3,278,782  10/1966  Kanter .................... 250/213 X VT
3,321,659  5/1967  Brody ..................... 250/213 X VT
3,401,294  9/1968  Cricchi .................... 340/173 CRT
3,440,428  4/1969  Kazan ..................... 250/213 VT

*Primary Examiner*—James W. Lawrence
*Assistant Examiner*—D. C. Nelms
*Attorneys*—J. G. Pere and L. A. Germain ABSTRACT: The tube of the invention is a device which is designed to perform the function of indicating the scene brightness distribution information of an input image in a graphic configuration by utilizing a storage grid in proximity focus to an anode and cathode and collector mesh so that deflection circuitry and coils are not necessary. A uniform flood is utilized to erase and project image information stored on the grid. Suitable logic control to effect sampling on a solid or segmented anode provide the readout characteristic desired.

INVENTORS
HARRY O. PFEIFFER
RICHARD H. WILLS

| MODE | PHOTO-CATHODE | COLLECTOR GRID | STORAGE GRID | ANODE |
|------|---------------|----------------|--------------|-------|
| WRITE | -500 | -400 | -100 | 0 |
| READ | -100 | -90 | -100 to -70 | 0 |
| ERASE | -100 | -90 | -70 | 0 |

INVENTORS
HARRY O. PFEIFFER
RICHARD H. WILLS
BY:
Oldham & Oldham
ATTORNEYS

BRIGHTNESS DISTRIBUTION ELECTRON STORAGE TUBE

Heretofore it has been known that there have been many types of electron image storage tubes utilized for many and variable purposes. However, most of these tubes have required the use of some type of focusing coil or deflection coils or phosphor to permit their proper coordinated operation. Further, it has not heretofore been the purpose with any of these prior art tubes to achieve the representation of the stored scene brightness distribution information in graphic form.

Therefore, it is the general object of the present invention to provide a new type of electron image storage and readout tube that utilizes a uniform electronic flood to permit optical information stored in the tube to be read out in linear graphic form.

A further object of the invention is to provide an electronic image storage tube that does not require any phosphor or any external coils for focus or deflection.

The aforesaid objects of the invention and other objects which will become apparent as the description proceeds are achieved by providing a uniform flood optical tube which comprises a sealed housing, a storage grid positioned about midway along the length of the housing, an input photosensitive cathode at one end of the tube in spaced parallel relation to the storage grid, a collector grid positioned between the photocathode and storage grid in spaced parallel relation to the storage grid, an output anode at the opposite end of the tube in spaced parallel relation to the storage grid, which is characterized by the anode and cathode spacing to the grid being about equal and at a distance in the order of 0.100 inches so that there will not be any substantial electron deviation for electrons passing down the tube between the cathode and the collector grid, and the collector grid and the storage grid, and the storage grid and the anode, means to control the electrical potential to the photosensitive cathode and collector grid and storage grid and anode, and means to detect the electrical potential on the anode to provide a readout indicating the number of electrons impinging thereon.

For a better understanding of the invention reference should be had to the accompanying drawings wherein.

Figure 1:
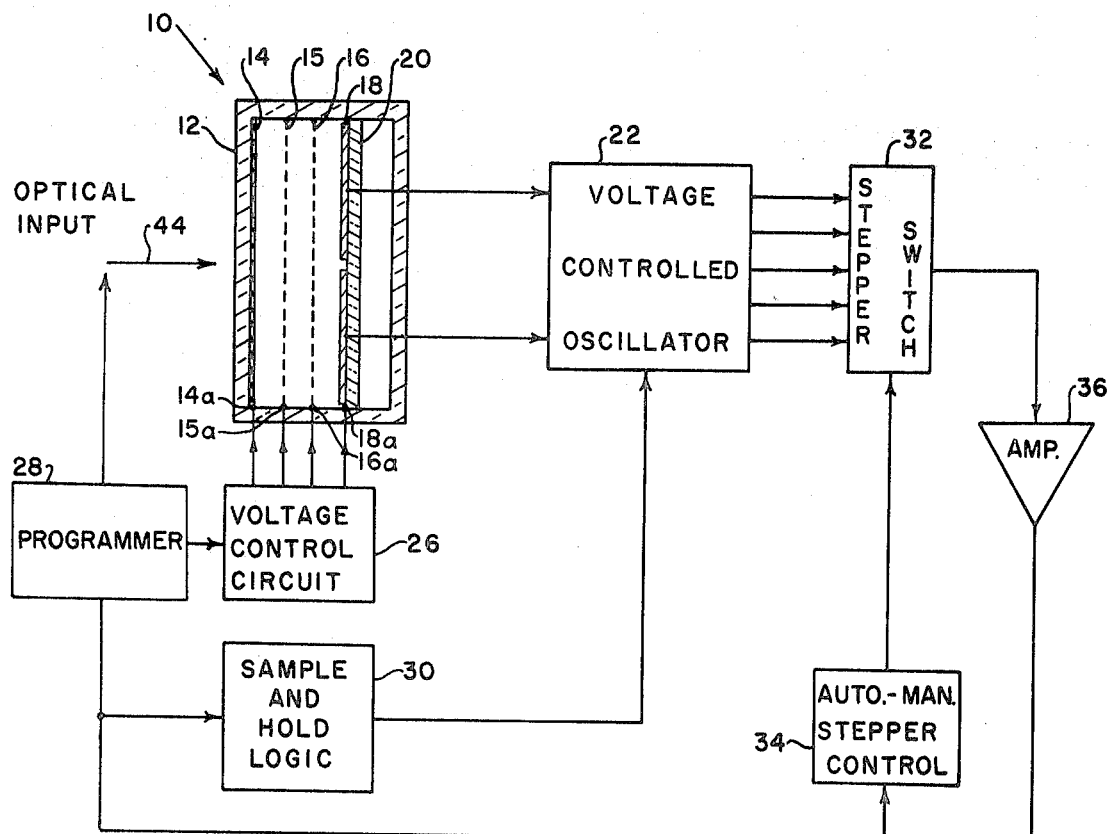
FIG. 1 is a block diagram schematic illustration of the tube and associated components to achieve the preferred operational use thereof.

With reference to the embodiment of the invention illustrated in FIG. 1 of the drawings, the numeral 10 indicates generally an integral housing normally made from glass or other insulating material and normally being cylindrical in shape. The other components in the tube comprise a glass faceplate 12, a photosensitive cathode 14, a conventional mesh storage grid 16, and electrically conductive output anodes 18. The anodes 18 are preferably segmented into many individual sections, a separate electrical output from each section. However, a solid anode could also be utilized. The anode sectors 18 are preferably deposited on an insulator substrate 20. Electrical potential control to the cathode 14, the collector grid 15, the storage grid 16 and anode sections 18 is provided by electrical contacts 14a, 15a, 16a, and 18a, respectively.

An important feature of the invention is that there are not any external coils for focus or deflection associated with the tube and that no phosphor is required for the readout means. To this end, it is critical to the proper operation of the tube that the spaced relationship of the cathode and anode to the storage grid 16 be substantially equal and of such distance that electrons passing from the cathode 14 to the storage grid 16 or the anode 18 are not deflected because of the close spaced relationship. Preferably, this spacing will be about 0.050 inches, although spacings of about 0.100 inches greater or 0.025 inches less than this would also be satisfactory.

The outputs from the anode 18 are amplified in a voltage controlled oscillator 22. Voltage control on the cathode, collector grid, storage grid, and anode might be through an appropriate voltage control circuit 26 properly actuated by a programmer 28. The programmer also controls a sample and hold logic control circuit 30 which in turn coordinates the oscillator 22. The outputs from the oscillator 22 pass into a stepper switch 32 which is appropriately controlled by an automanual stepper control circuit 34 that is also appropriately coordinated by the programmer 28. The output from stepper switch 32 is amplified by an appropriate amplifier 36 and passes into a DVM (digital volt meter) 38. The DVM 38 actuates a printer unit 40 and may be appropriately controlled as selectively desired by a sample pulse gate and time delay 42. The programmer 28 also controls an optical input signal 44 to the tube 10. Naturally, a conventional amplifier and sample and hold circuits would perform the same function as the oscillator 22.

Figure 2:
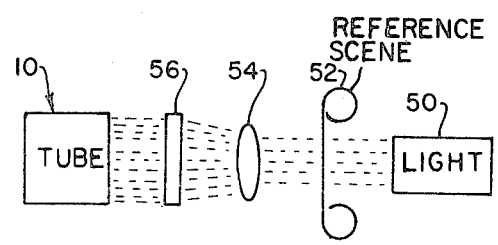
FIG. 2 is a schematic illustration of how the tube might be positioned in relation to other components to effect utilization of the tube.
Figure 2:
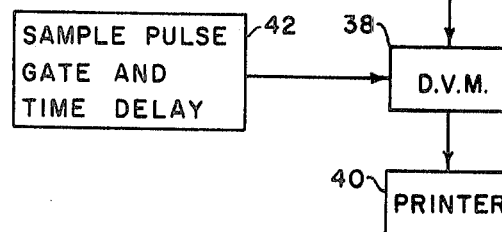

A typical system to provide input image information to the tube 10 is illustrated in FIG. 2. This includes a light source 50, a reference scene either positive or negative 52 to be backlighted by the light 50, a lens 54 to focus the scene onto the cathode end of the UFO tube 10. The operation of the tube to achieve a graphic illustration of the information stored therein prepresenting the scene 52 is achieved by utilizing a uniform flood from a source 56. This simply operates to provide a uniform light source as input information to the tube for readout purposes as will be more fully described hereinafter.

Figure 3:
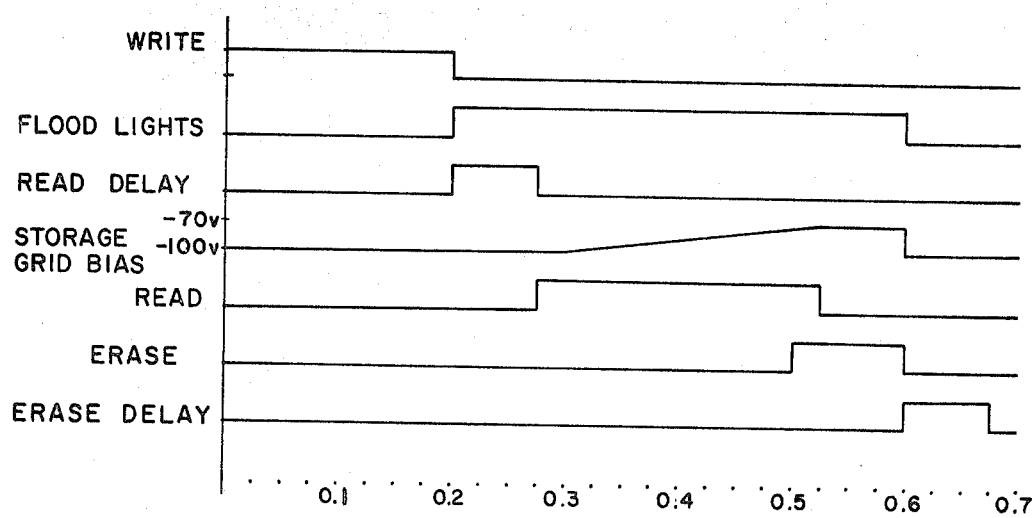
FIG. 3 is a graphic illustration of the electrical potentials with relation to time that might be utilized to achieve operation of the tube, also illustrating the graphic output of a store scene.
Figure 3:
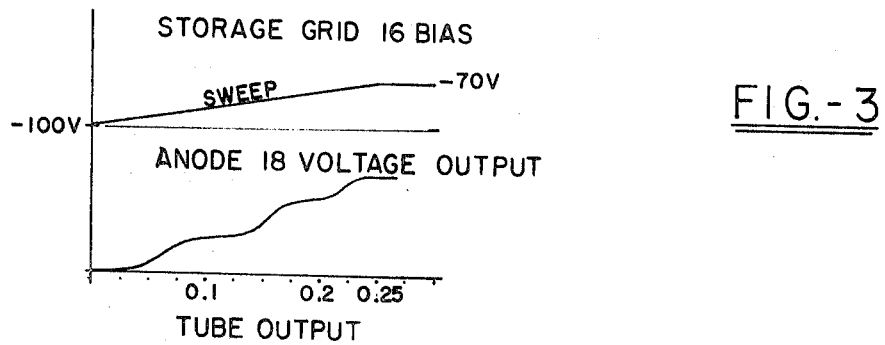

The graph of FIG. 3 most clearly illustrates the operation of the tube to obtain graphic readout of scene information. The following sequential steps comprise the preferred mode of operation:

1. A write pulse of approximately 0.075 second which is accomplished by backlighting the scene 52 with light source 50 with photocathode potential at minus 500 volts and collector grid potential at minus 400 volts and storage grid potential at minus 100 volts and anode potential at 0 volts.

2. Read is then accomplished over a period of approximately 0.375 seconds where uniform flood is utilized from source 56.

3. Coincident with the uniform flood, the photocathode potential is raised to minus 100 volts and the collector grid to minus 90 volts and the storage grid potential remains at minus 100 volts, with the minus 100 volts maintained on the storage mesh for the read delay of approximately 0.1 second to allow the uniform flood to stabilize, this being followed by 4. A read sweep pulse raising the storage mesh potential over a period of approximately 0.25 seconds to minus 70 volts. This is a ramped sweep voltage increase on the storage mesh, and is indicated in the expanded view of FIG. 3.

5. Totally erase the tube by holding the end of read potentials, photocathode potential at minus 100 volts, collector grid at minus 90 volts, and storage grid at minus 70 volts and anode at 0 volts with the erase pulse taking approximately 0.075 second is then followed by 6. An approximate 0.075-second erase delay to allow the uniform flood lights to extinguish.

7. An appropriate delay may then be incorporated to allow positioning of further scene information or processing of the DVM 38 and printer 40 as desired.

8. The cycle is ready to be restarted after approximately 0.675 second from the start by following the same steps outlined above.

The output of the uniform flood optical tube is illustrated in the bottom graph of FIG. 3 showing time in seconds up to approximately 0.25 and illustrating that the electron output from the anode 18 increases slowly and in steps giving a definite signature or graphical illustration of the scene information data during the ramp sweep voltage change on the storage mesh 16. This signature will exist only for scenes having a brightness distribution identical to this particular scene 52.

The ramped pulse voltage increase on the storage grid allows the tube to operate properly. Essentially, with both cathode and storage grid at equal potential no signal will be detected at the anode. As the storage grid potential increases, electrons begin to pass through the light portions of the stored image thus gradually building up the signal output from the anode. As the grid potential reaches its maximum cathode differential, electron passage from the uniform optical flood will pass through all dark areas of the stored image and complete the signal buildup on the anode.

The output signature of the respective anode segments 18 provide an individual graphic readout for each area of the scene represented by the anode segments. If all anode segments are summed, a single graphic illustration is provided for the total scene information, rather than for individual sectors thereof. Either of these techniques can be utilized depending upon the desired purpose. Naturally, with a solid or continuous anode, only a single output will be utilized.

The actual uses of the tube can be many and varied, but each will take advantage of the unique characteristics allowing the uniform optical flood in combination with the ramp voltage change on the storage grid to provide a linear graphic electrical output indication of the scene brightness information distribution that in effect becomes a signature of the scene. Naturally, a change in the signature with comparison of the same scene could indicate changes in the scene that might be utilized for change detection or other purposes.

While in accordance with the Patent Statutes, only the best known embodiment of the invention has been illustrated and described in detail, it is to be particularly understood that the invention is not limited thereto or thereby, but that the inventive scope is defined in the appended claims.

What is claimed is:

1. A uniform flood optical tube which comprises
   a sealed housing,
   a storage grid positioned about midway along the length of the housing,
   an input photosensitive cathode at one end of the tube in spaced parallel relation to the grid,
   an output anode at the opposite end of the tube in spaced parallel relation to the grid, which is characterized by
   the anode and cathode spacing to the grid being about equal and at a distance in the order of 0.100 inches so that there will not be any substantial electron deviation for electrons passing between the cathode and the grid and the grid and the anode,
   means to selectively control the electrical potential to the cathode, storage grid and anode, and
   means to detect the electrical potential on the anode to provide a readout indicating the number of electrons impinging thereon.

2. A tube according to claim 1 which includes a collector grid positioned between the cathode and storage grid in spaced parallel relation to the storage grid, means to provide image information to the cathode for storage on the storage grid, means to provide a uniform electron flood from cathode to anode, and means to selectively change the potential between the cathode and the grid during the uniform electron flood.

3. A tube according to claim 2 where the anode is divided into electrically disassociated segments and means are provided to electrically sample each segment individually.

4. A uniform flood optical tube which comprises a housing, a storage grid positioned about midway along the length of the housing, an input cathode at one end of the tube in spaced parallel relation to the storage grid, a collector grid positioned between the cathode and storage grid in spaced parallel relation to the storage grid, an output anode at the opposite end of the tube in spaced parallel relation to the grid, which is characterized by the anode and cathode spacing to the storage grid being about equal and at a distance of approximately 0.100 inches so that there will not be any substantial electron deviation for electrons passing down the tube between the cathode and the storage grid and the storage grid and the anode, means to selectively store image information on the storage grid means to effect a uniform electron flood down the tube from cathode to anode while simultaneously selectively changing the potential between cathode and storage grid, and means for detecting the number of electrons impinging upon the anode.

5. A tube according to claim 4 which includes means associated therewith to effect a visual print out of the signal depicting the number of electrons impinging upon the anode.

* * * * *